(12) United States Patent
McGowan

(10) Patent No.: US 9,411,639 B2
(45) Date of Patent: Aug. 9, 2016

(54) SYSTEM AND METHOD FOR MANAGING NETWORK NAVIGATION

(75) Inventor: James W. McGowan, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 90 days.

(21) Appl. No.: 13/492,318

(22) Filed: Jun. 8, 2012

(65) Prior Publication Data

US 2013/0332664 A1    Dec. 12, 2013

(51) Int. Cl.
| | |
|---|---|
| *G06F 12/00* | (2006.01) |
| *G06F 9/48* | (2006.01) |
| *G06F 11/14* | (2006.01) |
| *G06F 12/02* | (2006.01) |

(52) U.S. Cl.
CPC ............ *G06F 9/485* (2013.01); *G06F 11/1438* (2013.01); *G06F 11/1446* (2013.01); *G06F 11/1469* (2013.01); *G06F 11/1471* (2013.01); *G06F 12/0246* (2013.01)

(58) Field of Classification Search
CPC ............ G06F 11/1438; G06F 11/1446; G06F 11/1469; G06F 11/1471; G06F 12/0246
See application file for complete search history.

(56) References Cited

U.S. PATENT DOCUMENTS

| | | | |
|---|---|---|---|
| 5,896,128 A | | 4/1999 | Boyer |
| 6,137,485 A | | 10/2000 | Kawai et al. |
| 6,209,088 B1 | * | 3/2001 | Reneris .............................. 713/1 |
| 7,202,889 B2 | | 4/2007 | Suzuki et al. |
| 8,250,477 B1 | | 8/2012 | Schwarzberg et al. |
| 8,250,571 B2 | | 8/2012 | Tseng |
| 8,355,040 B2 | | 1/2013 | Trachtenberg et al. |
| 8,584,026 B2 | | 11/2013 | Lynk et al. |
| 2003/0206232 A1 | | 11/2003 | Suzuki et al. |
| 2004/0107199 A1 | * | 6/2004 | Dalrymple et al. ............ 707/100 |
| 2004/0189701 A1 | | 9/2004 | Badt |
| 2004/0236974 A1 | * | 11/2004 | Brown et al. .................. 713/320 |
| 2005/0062869 A1 | | 3/2005 | Zimmermann et al. |

(Continued)

FOREIGN PATENT DOCUMENTS

| | | |
|---|---|---|
| EP | 2 387 217 A2 | 11/2011 |
| EP | 2387217 A2 * | 11/2011 |

(Continued)

OTHER PUBLICATIONS

PCT International Search Report corresponding to PCT Application No. PCT/US2013/042211 filed May 22, 2013, International Search Report issued Aug. 9, 2013, pp. 1-4.
PCT Written Opinion of the International Search Authority corresponding to PCT Application No. PCT/US2013/042211 filed May 22, 2013, International Search Report issued Aug. 9, 2013, pp. 5-7.
Office Action issued on Feb. 12, 2016, in connection with Japanese Patent Application No. 2015-516038, 7 pgs.

*Primary Examiner* — Shawn X Gu

(74) *Attorney, Agent, or Firm* — Chiesa Shahinian & Giantomasi, PC

(57) ABSTRACT

A file comprising an application and data corresponding to a status of the application at a particular time is maintained in a first memory of a user device, the first memory comprising a persistent storage. The application may be a software application, for example. In response to a request, the file is transferred to a second memory of the device, the second memory comprising a random-access memory. The file is activated, or set up, as a running application. The user device may be a cell phone, a wireless telephone, a personal digital assistant, a personal computer, a laptop computer, a workstation, a mainframe computer, etc. In one embodiment, the file is brought to a foreground of the user device.

19 Claims, 9 Drawing Sheets

(56) References Cited

U.S. PATENT DOCUMENTS

| | | |
|---|---|---|
| 2008/0063389 A1 | 3/2008 | Fang et al. |
| 2009/0113444 A1 | 4/2009 | Hackborn et al. |
| 2009/0202114 A1 | 8/2009 | Morin et al. |
| 2010/0184422 A1* | 7/2010 | Ahrens ............ H04M 1/72525 455/419 |
| 2011/0143739 A1 | 6/2011 | Rippingale |
| 2012/0036181 A1 | 2/2012 | Isidore |
| 2012/0154510 A1 | 6/2012 | Huitema et al. |

FOREIGN PATENT DOCUMENTS

| | | |
|---|---|---|
| JP | 2000-215089 A | 8/2000 |
| JP | 2012-088940 A | 5/2012 |
| KR | 2011-0124625 | 11/2011 |

* cited by examiner

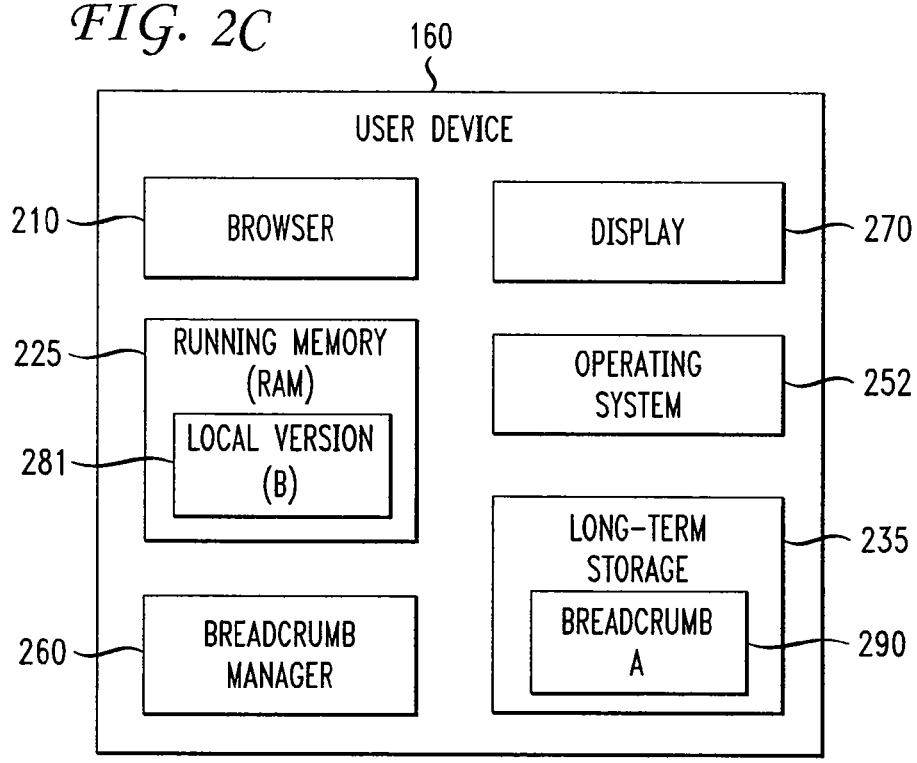
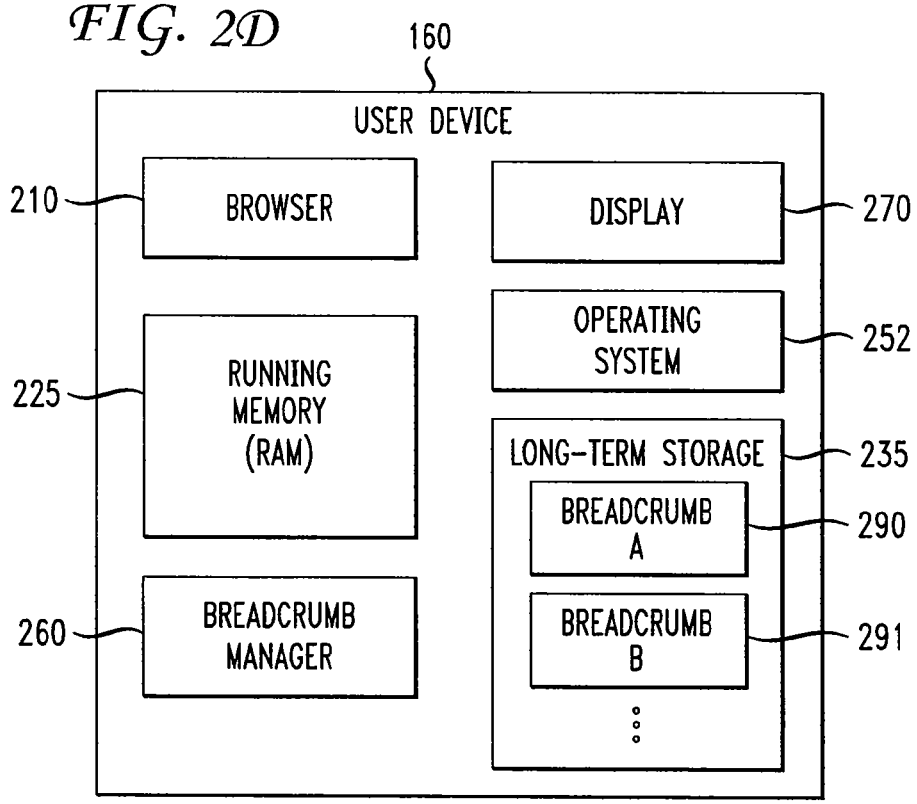

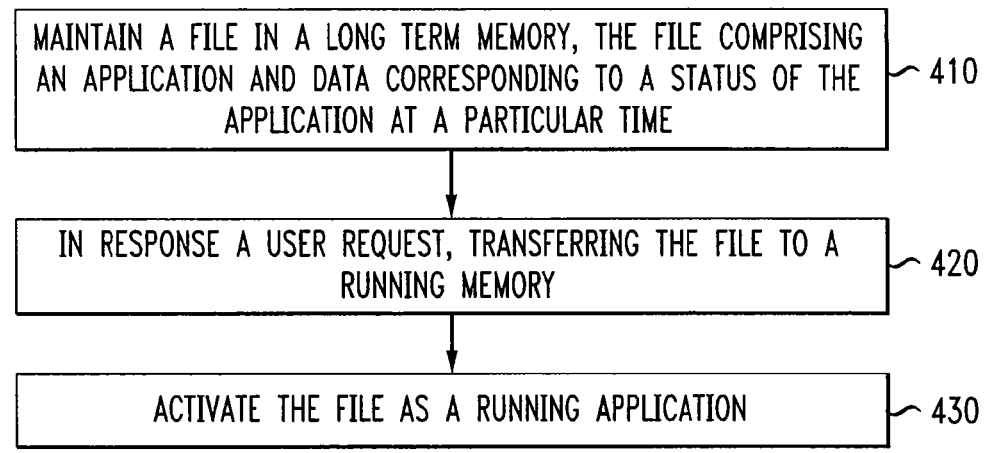
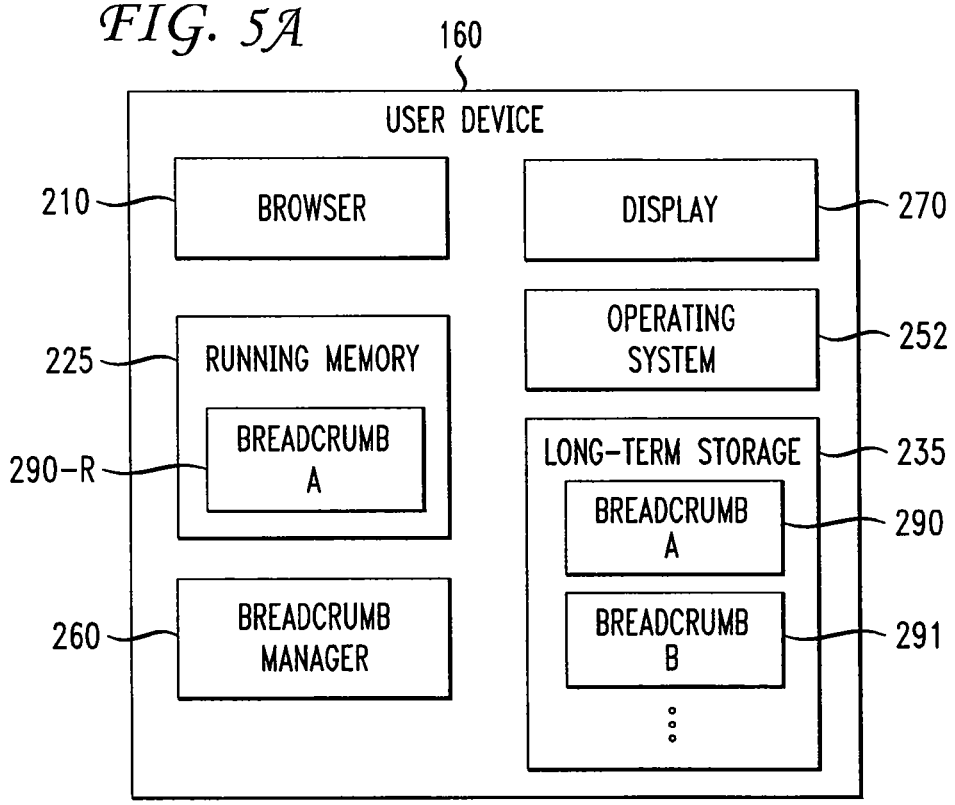

SYSTEM AND METHOD FOR MANAGING
NETWORK NAVIGATION

TECHNICAL FIELD

This specification relates generally to systems and methods for accessing applications via a network, and more particularly to systems and methods for managing navigation in a network.

BACKGROUND

As Internet use increases, tools and methods for navigating among websites become increasingly important. Many Internet browsers allow users to create lists of bookmarks or lists of favorite websites. Such lists typically contain links to various websites that the user has chosen. Such a link may contain a uniform resource locator (URL), for example. When the user subsequently selects a bookmark or favorite icon, the browser accesses the link to access the associated website.

SUMMARY

In accordance with an embodiment, a file comprising an application and data corresponding to a status of the application at a particular time is maintained in a first memory of a user device, the first memory comprising a persistent storage. The application may be a software application, for example. In response to a request, the file is transferred to a second memory of the device, the second memory comprising a random-access memory. The file is activated, or set up, as a running application. The user device may be a cell phone, a wireless telephone, a personal digital assistant, a personal computer, a laptop computer, a workstation, a mainframe computer, etc. In one embodiment, the file is brought to a foreground of the user device.

In one embodiment, the first memory comprises a long-term memory, and the second memory comprises a running memory.

In another embodiment, a plurality of files is maintained in the first memory, each respective file comprising a respective software application and data corresponding to a status of the respective application. A plurality of options corresponding respectively to the plurality of files is displayed. A selection of one of the plurality of options is received.

In one embodiment, one or more of the plurality of files is removed from the first memory, if a number of files stored in the first memory exceeds a predetermined number. Each file may comprise a timestamp indicating a time when the file was stored. A selected one of the plurality of files may be removed from the first memory, based on a respective timestamp.

These and other advantages of the present disclosure will be apparent to those of ordinary skill in the art by reference to the following Detailed Description and the accompanying drawings.

BRIEF DESCRIPTION OF THE DRAWINGS

FIGS. 2A-2D show functional components of an exemplary user device in accordance with an embodiment;

FIG. 4 is a flowchart depicting a method of retrieving and activating a breadcrumb in accordance with an embodiment;

FIG. 5A shows functional components of the user device of FIGS. 2A-2D in accordance with an embodiment;

DETAILED DESCRIPTION

Figure 1:
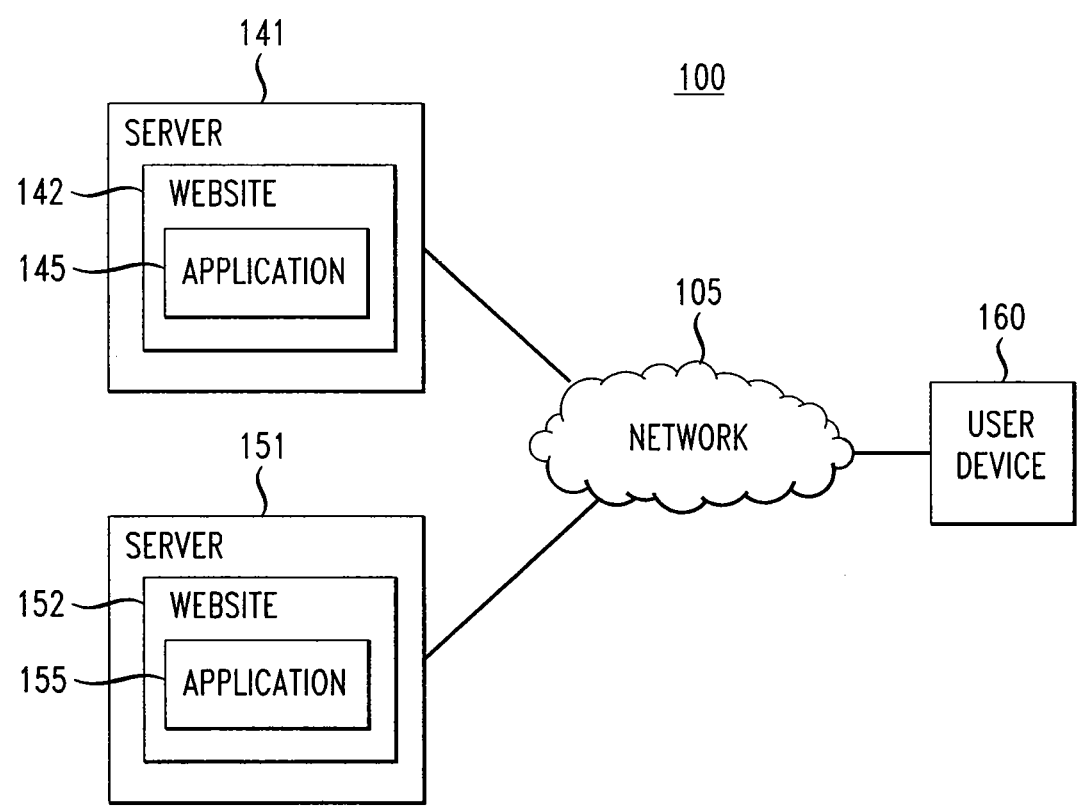
FIG. 1 shows a communication system in accordance with an embodiment.

FIG. 1 shows a communication system 100 that may be used to provide online services, in accordance with an embodiment. Communication system 100 comprises a network 105, a first server 141, a second server 151, and a user device 160. In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

In the illustrative embodiment of FIG. 1, server 141 maintains and operates a website 142, which provides online services via network 105. Website 142 may be accessible via a World Wide Web page that is hosted by server 141 and which may be viewed using a conventional Web browser, for example.

Website 142 is associated with one or more software applications stored on server 141, including application 145. In the illustrative embodiment of FIG. 1, application 145 is an online game application. For example, a user may access website 142 and choose to play a game by selecting an appropriate icon displayed on a web page. When the user selects the icon, application 145 executes, allowing the user to play the desired game. In other embodiments, application 145 may comprise any other type of application, such as an online information service, an online document processing service, a media delivery service playing audio, video or showing text, or any combination of audio, video, and text, a communication application such as an email reader, a book reader, a photo or slideshow viewer including viewers for photographs or technical drawings, a social networking website, a blog, a map (such as a road or weather map), an online whiteboard or drawing tool, or any other type of service accessible via network 105.

When a user employing user device 160 accesses website 142 and activates application 145, server 141 serves all or a portion of application 145 to user device 160. User device 160 receives the application (or portion thereof) and stores the application (or portion thereof) in a running memory. The version of application 145 in running memory is then activated, or set up, as a running application on user device 160. In one embodiment, the application or program is placed into active memory, and the application or program is prepared for execution, a function normally performed by the device's operating system, relying upon the context of the particular operating system used.

Similarly, server 151 maintains and operates a website 152 which provides online services via network 105. Website 152 may be accessible via a World Wide Web page that is hosted by server 151 and which may be viewed using a conventional Web browser, for example.

Website 152 is associated with one or more software applications stored on server 151, including application 155. In the illustrative embodiment of FIG. 1, website 152 is a news website that provides access to various news articles, and application 155 is an application that displays selected news articles. For example, a user may access website 152 and choose to read an article by selecting an appropriate icon displayed on a web page. When the user selects the icon, application 155 executes, allowing the user to read the desired article. In other embodiments, application 155 may comprise any other type of application, such as an online game application, an online information service, an online document processing service, a media delivery service playing audio, video or showing text, or any combination of audio, video, and text, a communication application such as an email reader, a book reader, a photo or slideshow viewer including viewers for photographs or technical drawings, a social networking website, a blog, a map (such as a road or weather map), an online whiteboard or drawing tool, or any other type of service accessible via network 105.

When a user employing user device 160 accesses website 152 and activates application 155, server 151 serves all or a portion of application 155 to user device 160. User device 160 receives the application (or portion thereof) and stores the application (or portion thereof) in a running memory. The version of application 155 in running memory is then activated, or set up, as a running application on user device 160.

User device 160 may be any device that enables a user to communicate via network 105. User device 160 may be connected to network 105 through a direct (wired) link, or wirelessly. User device 160 may have a display screen (not shown) for displaying information. In the illustrative embodiment of FIG. 1, user device 160 comprises a mobile communication device such as a cell phone or other wireless telephone, a personal digital assistant, etc. Alternatively, user device 160 may be a personal computer, a laptop computer, a tablet computer, a workstation, a mainframe computer, etc. Other devices may be used.

Figure 2A:
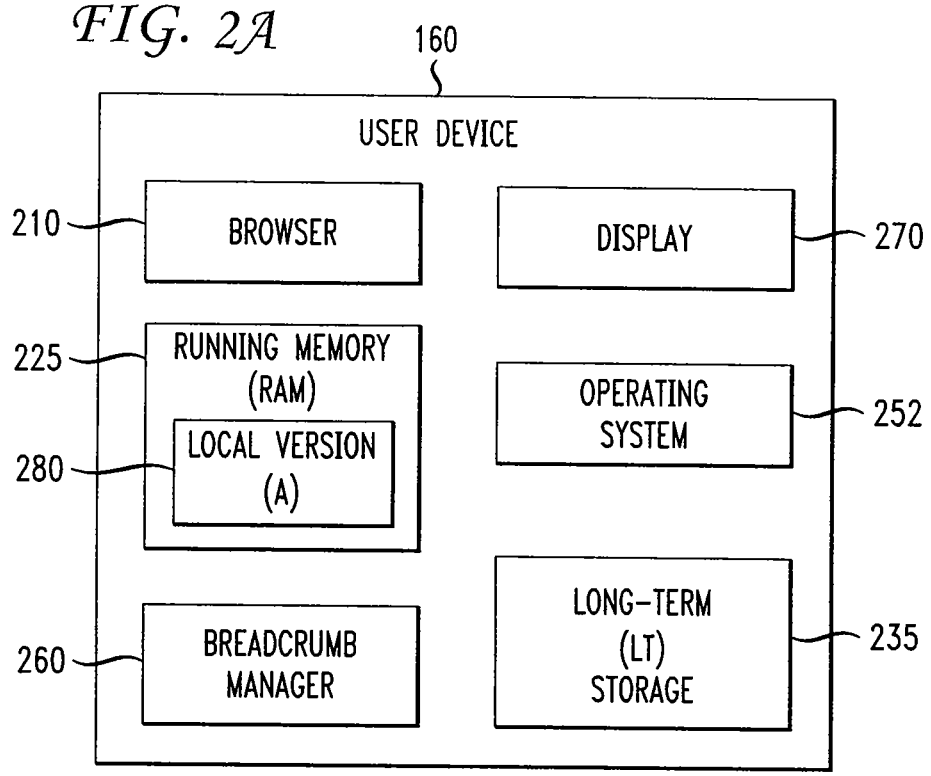

FIG. 2A shows functional components of user device 160 in accordance with an embodiment. User device 160 comprises a web browser 210 and a display 270. Web browser 210 may be a conventional web browser used to access World Wide Web sites via the Internet, for example. Display 270 displays text documents, spreadsheet data, Web pages, videos, and other information to a user. For example, a web page of an online game may be displayed on display 270.

User device 160 comprises an operating system 252. Operating system 252 controls the operation of other components of user device 160. Operating system 252 may comprise software, for example.

User device 160 also comprises a running memory 225 and a long-term storage 235. Running memory 225 is used from time to time by other components of user device 160 to store control data and other information temporarily while user device 160 is operating. From time to time, all or a portion of a software application may be stored temporarily in running memory 225 while the application is executing on user device 160. For example, when an online application is accessed via network 105, all or a portion of the online application may be stored and maintained temporarily in running memory 225 while the application is executing. Typically, after the user logs off, or navigates away from, the online application, the online application (or portion thereof) that was maintained in running memory 225 may be removed from running memory 225. Running memory 225 may comprise static random access memory (RAM), or dynamic random access memory (DRAM), for example. In other embodiments, running memory 225 may comprise other types of memory devices.

Long-term storage 235 stores various types of data in a manner that is more persistent and long-term than running memory 225. Long-term storage 235 may comprise non-volatile, persistent storage in which a user or application can specify the logical partitioning of data for retrieval. In one embodiment, long-term storage 235 may comprise, for example, any memory except working memory used for instructions and data sent directly to a processor for execution of code. In various embodiments, long-term memory 235 may comprise, without limitation, one or more spinning disk drives, solid state disk drives, optical disks, tape drives, removable memory chips such as SD and microSD cards, USB drives, network storage, cloud storage mechanisms, etc. Long-term storage 235 may be "mounted" by an operating system and may be an addressable "drive" space (as opposed to an extension of system memory). Other types of memory devices may be used.

User device 160 also comprises a breadcrumb manager 260. Breadcrumb manager 260 from time to time receives a request to store information concerning an online application (such as application 145 or application 155) that user device 160 is currently accessing via network 105. In response, breadcrumb manager 260 records in long-term storage 235 information concerning the application that the user device is currently accessing. The information may include the local version of the application and related data stored in RAM. Such a file is referred to herein as a "breadcrumb."

In accordance with the embodiment of FIG. 1, a user may employ user device 160 to access various websites via network 105. For example, a user may employ user device 160 to access website 142 and play a particular game associated with application 145. While accessing website 142, and application 145, the user may create and store a breadcrumb associated with application 145 to enable the user to return to a selected web page associated with application 145, at a later time. The user may then navigate to other websites, and subsequently use the stored breadcrumb to return to application 145 and the selected web page.

Suppose that a user employs browser 210 (of user device 160) to access website 142, in order to play a desired game. In a well-known manner, the user may be required to log into a user account in order to access the website.

Figure 3A:
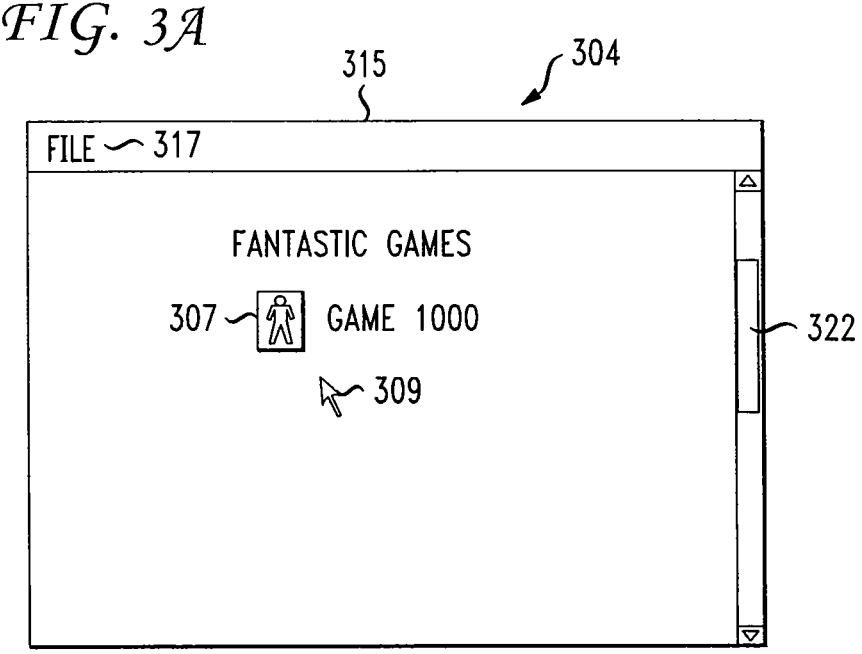
FIGS. 3A-3H show various web pages associated with respective network applications in accordance with an embodiment.

For example, the user may employ browser 210 to navigate to website 142. When the user accesses website 142, website 142 may communicate with browser 210 and cause a web page such as that shown in FIG. 3A to be displayed on displayed 270. Web page 304 shows a web page entitled "Fantastic Games." Browser 210 may also display a menu bar 315 that displays one or more menu options such as file option 317, and a scroll bar 322 allowing a user to scroll up and down within page 304. In other embodiments, the menu bar and/or scroll bar may not be displayed. Web page 304 includes an icon 307 which may be selected to play a particular game entitled "Game 1000." In the illustrative embodiment, application 145 is associated with the game entitled "Game 1000."

Supposing that the user wishes to play "Game 1000," the user selects icon 307 by clicking on the icon with a cursor 309, or by pressing on the icon with a finger (on a touch screen, for example). When the user selects icon 307, website 142 responds by providing to user device 160 a version of all or a portion of application 145. User device 160 receives this version of application 145 and stores it in running memory 225 as local version (A) 280, as shown in FIG. 2A.

Figure 3B:
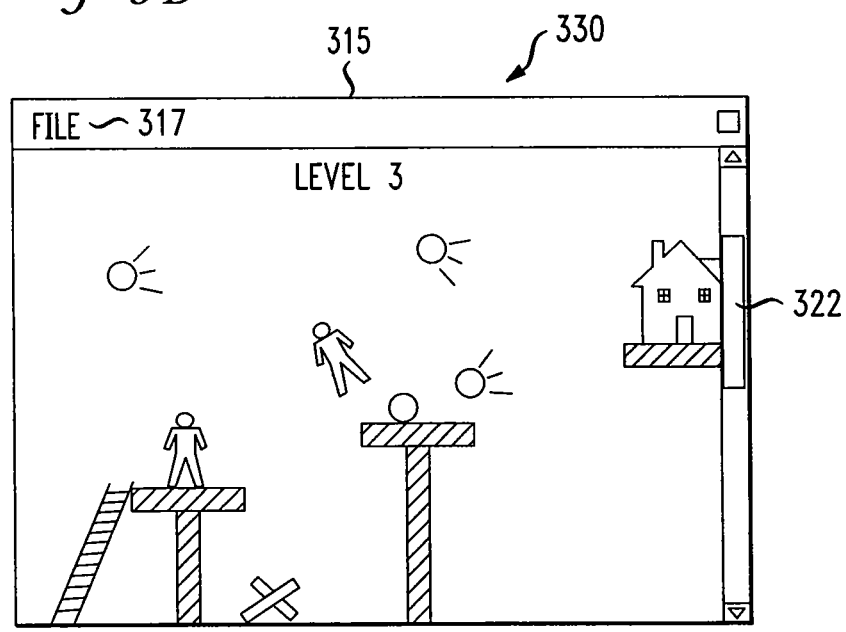

In the illustrative embodiment, local version (A) 280 runs (for example, executes or launches) on user device 160 and causes a web page such as that shown in FIG. 3B to appear on display 270 (of user device 160). As shown by FIG. 3B, web page 330 shows a page of the desired game. The user begins to play the game. Local version (A) 280 may be updated while the user plays the game to reflect the user's score, level attained, etc. While the user plays the game, local version (A) 280 may also store separately (at other locations within running memory 225) data relating to the status of the game, the web page, and/or the user's activities. For example, related data such as user preferences for input, user playing time per session and in aggregate, a representation of one or more achievements attained in a game (such as levels completed, scores and/or rankings per level), user authentication information (such as a username and password, or one-time credentials passed by application 145 to local version (A) 280 to track, for example, a user's active session with the game), relevant information from other players of an online multi-player game, etc., may be stored in running memory 225.

Suppose that the user plays the game for a number of minutes and then receives a telephone call. Suppose further that the user wishes to close page 330 and take the telephone call, but that the user wishes to create a breadcrumb so that he may easily return to web page 330 as shown in FIG. 3B at a later time (e.g., after the telephone call ends). In accordance with an embodiment, the user may create and save in long-term storage 235 a file comprising information relating to web page 330, which the user is currently accessing.

Figure 3C:
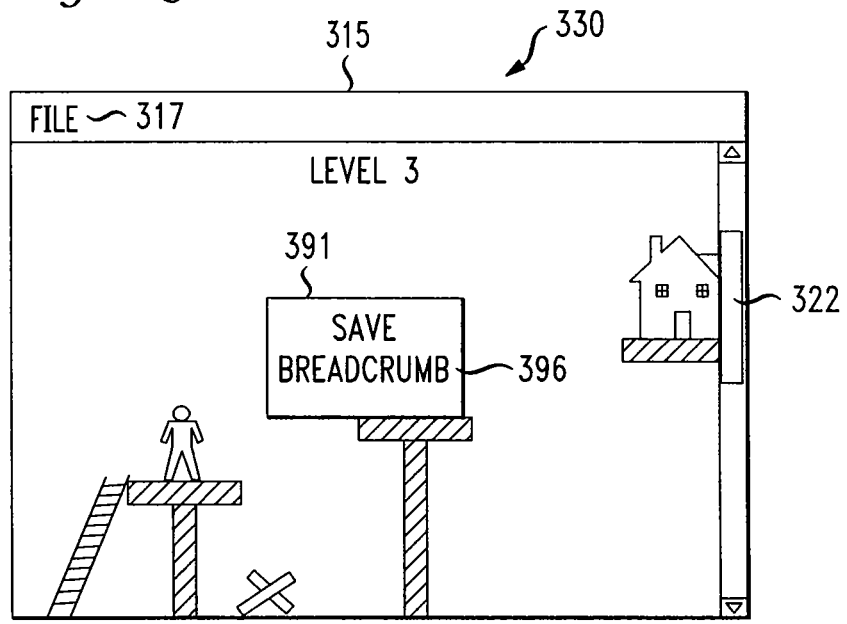

In one embodiment, the user selects a "save breadcrumb" option, for example, by triple-clicking a button on a computer mouse. Alternatively, the user may triple click on an icon, or a designated location, on a touch screen. Alternatively, as shown in FIG. 3C, the user may select a "Save Breadcrumb" option 396 from a menu 391 displayed on the screen. Alternatively, the operating system may be pre-configured to automatically create a breadcrumb when, for example, a game application is in progress and a call is received. Other methods of selecting an option to save a breadcrumb may be used. Breadcrumb manager 260 receives the user's selection of the save breadcrumb option.

Figure 2B:
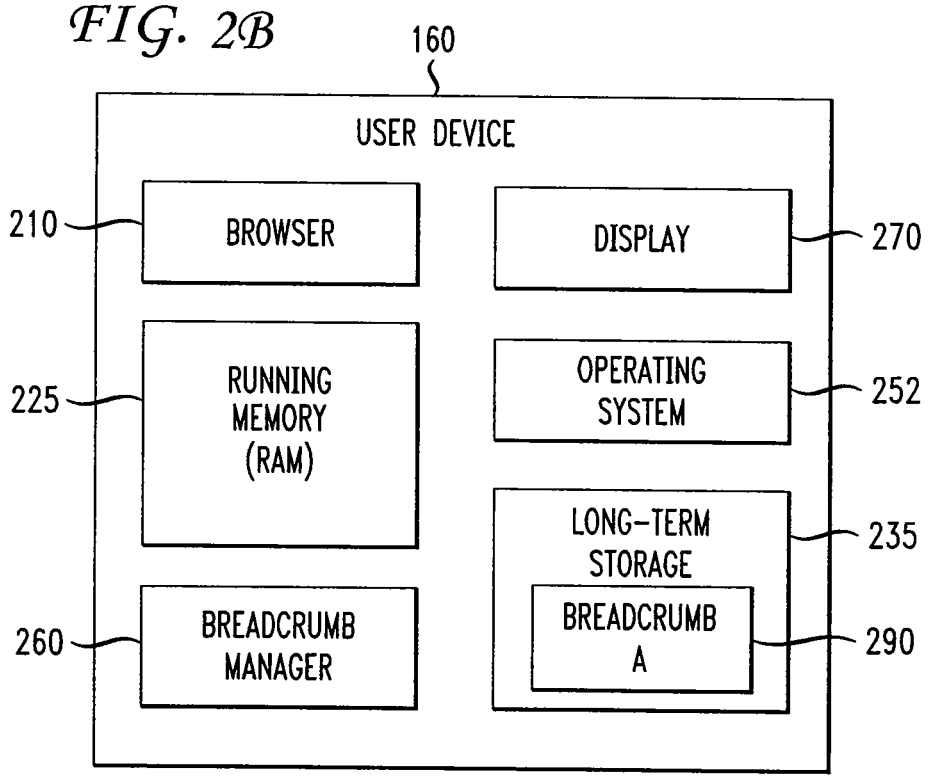

In response to the user's selection of the save breadcrumb option, breadcrumb manager 260 causes a file containing local version (A) 280, along with other related data copied from running memory 225, to be saved in, or transferred to, long-term storage 235, as breadcrumb A (290), as shown in FIG. 2B. Such a file is referred to as a "breadcrumb."

In one embodiment, a breadcrumb comprises all or a portion of the information described below. The following description uses terminology and notation associated with JavaScript Object Notation (JSON) and the Android operating system. Other formats, such as XML or proprietary formats, and other operating systems may be used.

A breadcrumb associated with a local version of an application includes the following fields: id, appName, desc, timestamp, dex, ram. The field id is a unique identifier assigned to organize the breadcrumbs. The field appName includes the user device's name for the application, which is typically the name of the executable used to initially launch the application. The "desc" field includes a long application name used by the device to describe the application to the user. The field "timestamp" indicates when the breadcrumb was initially stored. In one embodiment, the timestamp is indicated using the well-known ticks format. The fields "dex" and "ram" may each be many megabytes in length. Each of these fields holds binary data. The field "dex" includes the actual file for the application. The field "ram" includes the content of all random access memory (RAM) that is associated with the application while it is running, typically in system RAM. Thus, the field "ram" is a representation of the application as stored in memory at the time the breadcrumb was taken. This data is typically in RAM, portions or all of the application may be swapped to a page file (this occurs when the operating system puts a portion of the application out of physical RAM and into storage). Such memory swapping techniques are well known to those with ordinary skill in the art.

Other formats, including those that support binary natively, may be used for both the dex and ram content, and also for the breadcrumb itself. Additional information may be stored with the breadcrumb, including user preferences, system information such as a unique identifier for the system, the relevant state of any hardware devices such as network interface controllers (NICs), or any other informational useful for identifying and using the breadcrumb.

Suppose now that after completing the telephone call, the user decides to review several news articles prior to returning to "Game 1000." The user accordingly employs browser 210 and navigates to news website 152. When the user navigates away from "Game 1000" displayed on web page 330, local version (280) may be removed from running memory 225, as shown in FIG. 2B.

Figure 3D:
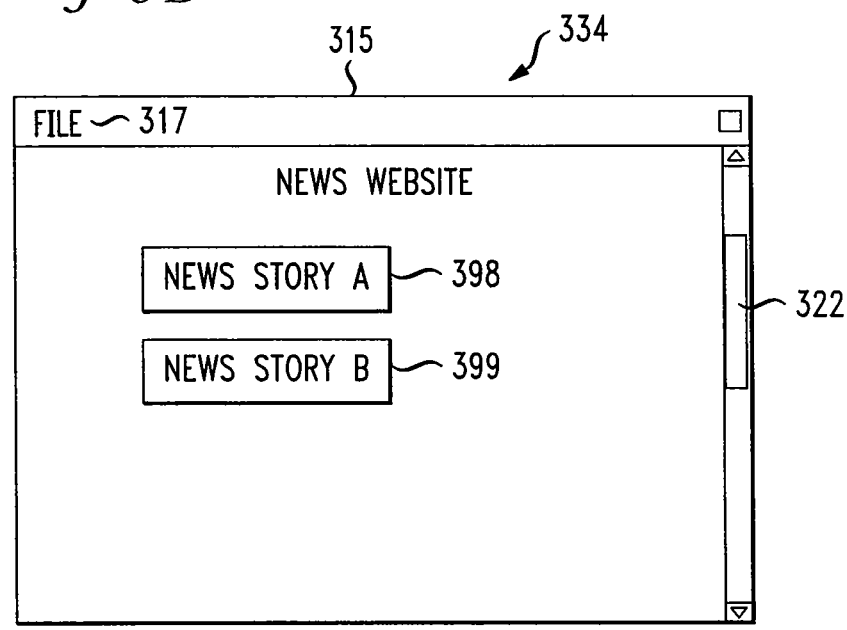
Figure 3E:
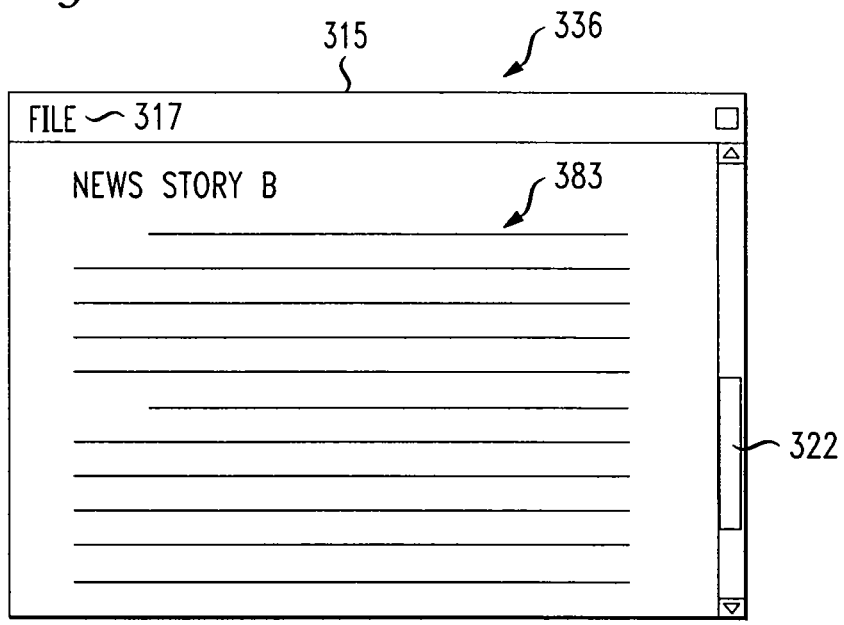

When the user accesses website 152, website 152 causes a local version of application 155 to be stored in running memory 225 as local version (B) 281, as shown in FIG. 2C. Local version (B) 281 causes a news web page such as that shown in FIG. 3D to be displayed on display 270. News web page 334, entitled "News Website" includes a first icon 398 for "News Story A" and a second icon 399 for "News Story B." Supposing that the user clicks on icon 399, local version (B) 281 causes a web page 336 showing an article 383 entitled "News Story B" to be displayed, as shown in FIG. 3E.

Suppose that the user reads a portion of article 383 and then wishes to create a second breadcrumb so that he may easily return at a later time to web page 336 to finish reading the article. The user accordingly creates a second breadcrumb comprising information relating to web page 336. The user selects a save breadcrumb option, in the manner described above. Breadcrumb manager 260 receives the user's selection of the save breadcrumb option, and in response, causes a breadcrumb associated with local version (B) 281 to be saved in long-term storage 235. Referring to FIG. 2D, a breadcrumb associated with local version (B) 281 is stored in long-term storage 235 as breadcrumb B (291).

Figure 3F:
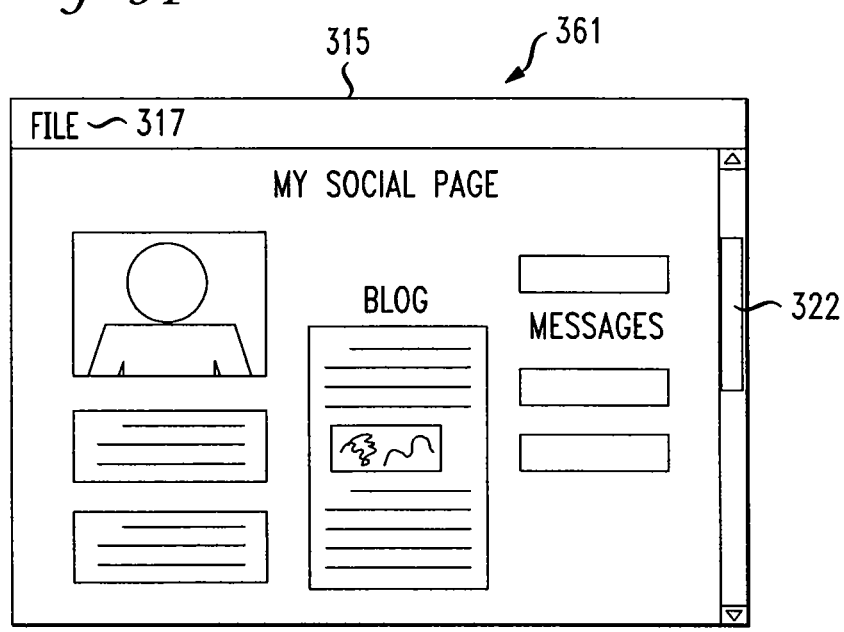

The user now navigates away from web page 336 to visit a personal web page at a social networking website, such as web page 361 shown in FIG. 3F. When the user navigates away from web page 336, local version (B) 281 is removed from running memory 225, as shown in FIG. 2D.

Now suppose that the user wishes to return to the page of "Game 1000" that he had been playing when he received a telephone call. FIG. 4 is a flowchart of a method for retrieving and activating a breadcrumb in accordance with an embodiment. At step 410, a file comprising an application and data corresponding to a status of the application at a particular time is maintained in a long-term memory. As discussed above, breadcrumb A (290) and breadcrumb B (291) are maintained in long-term storage 235 of user device 160.

Figure 3G:
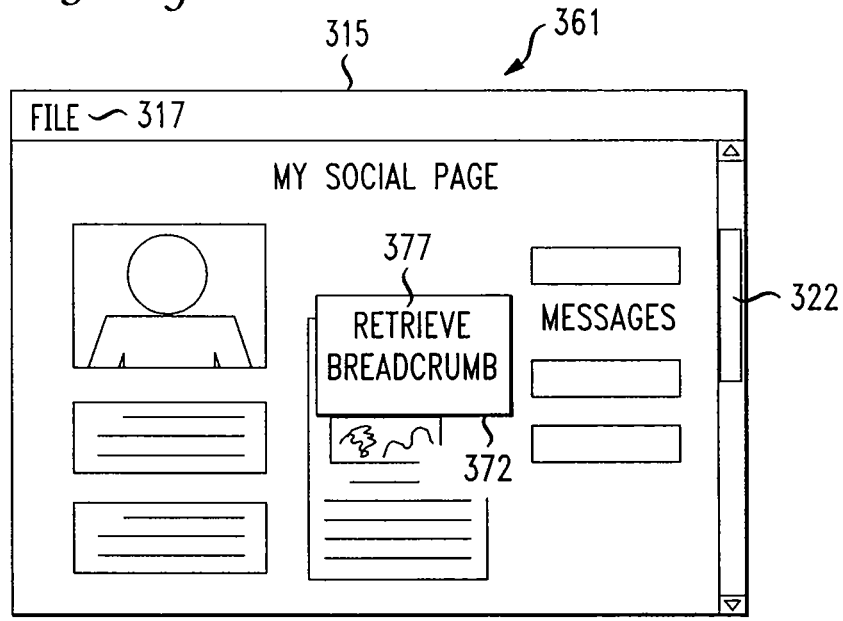

In accordance with an embodiment, the user may select an option to retrieve a breadcrumb. For example, the user may click an appropriate button to cause a menu such as that shown in FIG. 3G to appear. Menu 372 includes a retrieve breadcrumb option 377. In the illustrative embodiment, the user selects retrieve breadcrumb option 377, and in response, breadcrumb manager 260 identifies, in storage, breadcrumb A (290) and breadcrumb B (291).

Figure 3H:
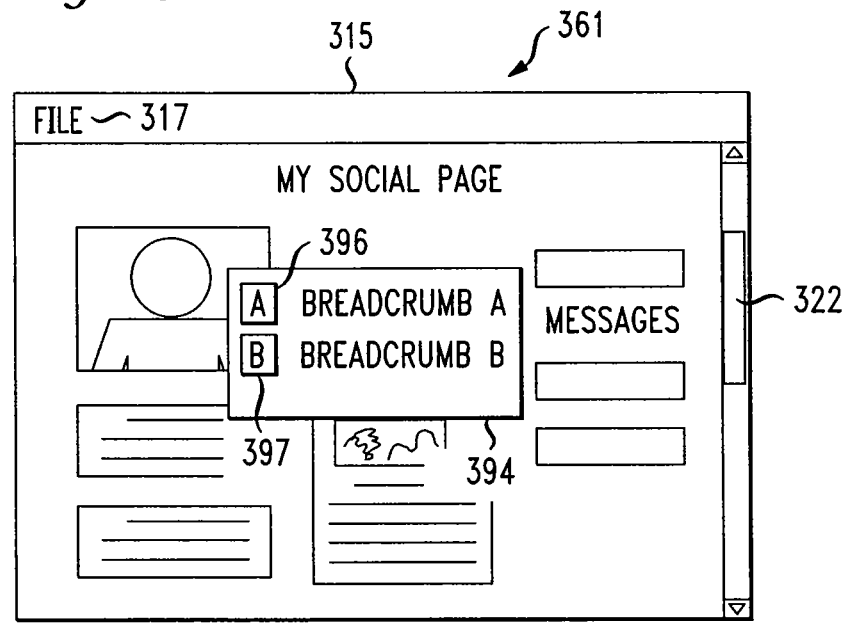

A plurality of options corresponding respectively to the plurality of stored breadcrumb files is displayed. Thus, breadcrumb manager 260 causes a second menu that includes one or more icons to be displayed on display 270, as shown in FIG. 3H. Menu 394 includes a first icon 396 associated with breadcrumb A (290) and a second icon 397 associated with breadcrumb B (291).

A selection of one of the plurality of options is received. Recalling that breadcrumb A is associated with "Game 1000," the user selects icon 396 associated with breadcrumb A (290). Breadcrumb manager 260 receives the user's selection.

At step 420, in response a user request, the file is transferred to a running memory. Thus, in response to the user's selection of retrieve breadcrumb option 377 and of icon 396, breadcrumb manager 260 retrieves a copy of breadcrumb A (290) from long-term storage 235 and stores the copy in running memory 225 as breadcrumb A (290-R), as shown in FIG. 5A.

At step 430, the file is activated, or set up, as a running application. In one embodiment, the file is re-launched. In another embodiment, the file is re-executed. In another embodiment, a portion of the file is copied to a section of RAM memory listed as available (or not listed as unavailable) by the operating system. The operating system's memory tracking tables are modified to reflect this change, and the values of the host processor's registers are set to the values they were set to at the time the breadcrumb was created, except the operating system instruction register, which is set to a memory location within active memory at the same offset that it had been set to when the breadcrumb was created. For example, if the instruction was at the one-hundredth word of the application in active memory when the breadcrumb was created, the operating system instruction register is set to the one-hundredth word of the application in working memory (which is typically a different value in physical system RAM or in the operating system's memory address space).

Figure 5B:
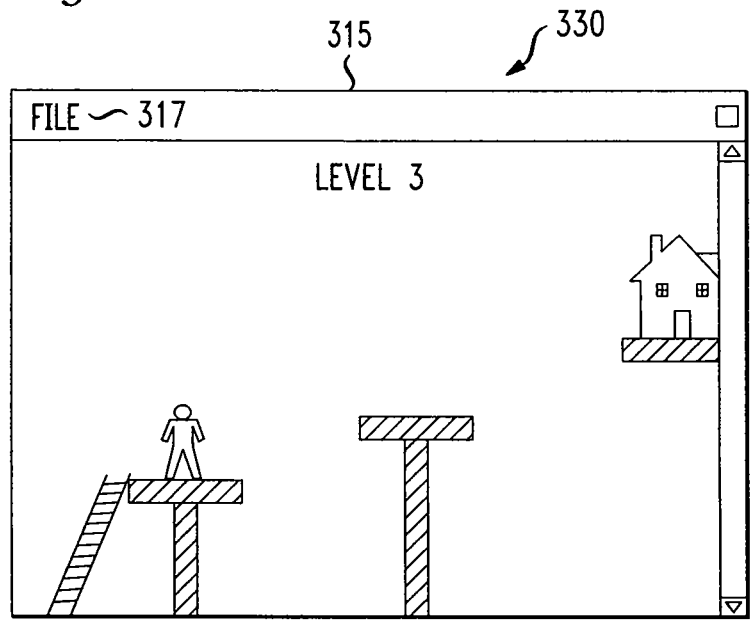
FIG. 5B shows a web page in accordance with an embodiment.

In the illustrative embodiment, breadcrumb manager 260 sets up the version of breadcrumb A (290-R) that is now stored in running memory 225, as a running application. After being set up as a running application, breadcrumb A (290-R) causes web page 330 of "Game 1000" to appear on display 270, as shown in FIG. 5B. The user may now resume playing the game at or near the point where he had earlier stopped the game.

Any number of breadcrumbs may be stored in storage 235. The breadcrumbs stored in storage 235 may be stored for any suitable length of time. In one embodiment, breadcrumb manager 260 may monitor long-term storage 235 and ensure that no more than a predetermined number of breadcrumbs are stored. For example, in one embodiment, up to ten breadcrumbs are stored in long-term storage 235. In particular, the most recent ten breadcrumbs are stored. Breadcrumb manager 260 removes older breadcrumbs from long-term storage 235 when the number of stored breadcrumbs exceeds ten. Removal of one or more breadcrumbs may be performed, for example, by examining the respective timestamps of the stored breadcrumbs, and removing those breadcrumbs that are oldest, as indicated by their respective timestamps.

In various embodiments, the method steps described herein, including the method steps described in FIG. 4, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
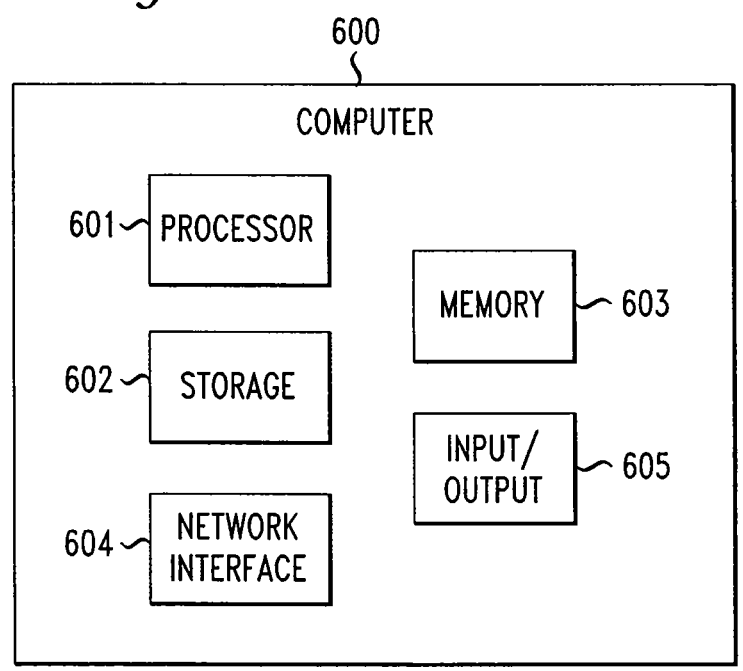
FIG. 6 shows components of an exemplary computer that may be used to implement certain embodiments of the invention.

A high-level block diagram of an exemplary computer that may be used to implement systems, apparatus and methods described herein is illustrated in FIG. 6. Computer 600 comprises a processor 601 operatively coupled to a data storage device 602 and a memory 603. Processor 601 controls the overall operation of computer 600 by executing computer program instructions that define such operations. The computer program instructions may be stored in data storage device 602, or other computer readable medium, and loaded into memory 603 when execution of the computer program instructions is desired. Thus, the method steps of FIG. 4 can be defined by the computer program instructions stored in memory 603 and/or data storage device 602 and controlled by the processor 601 executing the computer program instructions. For example, the computer program instructions can be implemented as computer executable code programmed by one skilled in the art to perform an algorithm defined by the method steps of FIG. 4. Accordingly, by executing the computer program instructions, the processor 601 executes an algorithm defined by the method steps of FIG. 4. Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors, and may be the sole processor or one of multiple processors of computer 600. Processor 601 may comprise one or more central processing units (CPUs), for example. Processor 601, data storage device 602, and/or memory 603 may include, be supplemented by, or incorporated in, one or more application-specific integrated circuits (ASICs) and/or one or more field programmable gate arrays (FPGAs).

Data storage device 602 and memory 603 each comprise a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as a cathode ray tube (CRT) or liquid crystal display (LCD) monitor for displaying information to the user, a keyboard, and a pointing device such as a mouse or a trackball by which the user can provide input to computer 600.

Any or all of the systems and apparatus discussed herein, including user device 160, and components thereof, including web browser 210, display 270, breadcrumb manager 260, running memory 225, and long-term storage 235, may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method comprising:
maintaining a file in a first memory of a user device, the file comprising a local version of a previously running online application executed from a website and contents of a volatile memory associated with the previously running online application at a first instance of time during execution of the previously running online application, the first memory comprising a persistent storage;
in response to a request, transferring the file to a second memory of the user device, the second memory comprising a random-access memory; and
activating, at a second instance of time subsequent to the first instance of time and subsequent to navigating away from the website, the file as a running application to continue running of the previously running online application from the prior first instance of time.

2. The method of claim 1, wherein the user device comprises one of a cell phone, a wireless telephone, a personal digital assistant, a personal computer, a laptop computer, a workstation, and a mainframe computer.

3. The method of claim 2, further comprising:
bringing the file to a foreground of the user device.

4. The method of claim 1, further comprising:
maintaining a plurality of files in the first memory, each respective file comprising a respective software application and data corresponding to a status of the respective software application;
displaying a plurality of options corresponding respectively to the plurality of files; and
receiving a selection of one of the plurality of options.

5. The method of claim 4, further comprising:
removing one or more of the plurality of files from the first memory, if a number of files stored in the first memory exceeds a predetermined number.

6. The method of claim 5, wherein each file comprises a timestamp indicating a time when the file was stored.

7. The method of claim 6, further comprising:
removing a selected one of the plurality of files from the first memory, based on a respective timestamp.

8. The method of claim 1, wherein the previously running online application comprises a previously running online software application.

9. The method of claim 1, wherein:
the first memory comprises a long-term memory; and
the second memory comprises a running memory.

10. A device comprising:
a first memory configured to store first data, the first memory comprising a persistent storage;
a second memory configured to store second data, the second memory comprising a random-access memory; and
a processor configured to:
store in the first memory a file comprising a local version of a previously running online application executed from a website and contents of a volatile memory associated with the previously running online application at a first instance of time during execution of the previously running online application;
in response to a request, transfer the file to the second memory; and
activate, at a second instance of time subsequent to the first instance of time and subsequent to navigating away from the website, the file as a running application to continue running of the previously running online application from the prior first instance of time.

11. The device of claim 10, wherein the processor is further configured to:
bring the file to a foreground of the device.

12. The device of claim 10, wherein the processor is further configured to:
maintain a plurality of files in the first memory, each respective file comprising a respective application and data corresponding to a status of the respective application at a time when the respective file was generated.

13. The device of claim 12, wherein the processor is further configured to:
remove one or more of the plurality of files from the first memory, if a number of files stored in the first memory exceeds a predetermined number.

14. The device of claim 13, wherein each file comprises a timestamp indicating a time when the file was stored.

15. The device of claim 14, wherein the processor is further configured to:
remove a selected one of the plurality of files from the first memory, based on a respective timestamp.

16. The device of claim 10, wherein the device comprises one of a cell phone, a wireless telephone, a personal digital assistant, a personal computer, a laptop computer, a workstation, and a mainframe computer.

17. The device of claim 10, wherein:
the first memory comprises a long-term memory; and
the second memory comprises a running memory.

18. A method comprising:
receiving an online application executed from a website via a network;
storing the online application in a first memory, the first memory comprising a random-access memory;
activating the online application as a running online application;
in response to a request to store a status of the running online application, storing in a second memory a file comprising a local version of the running online application and contents of a volatile memory associated with the running online application at a first instance of time during execution of the running online application, the second memory comprising a persistent storage,
wherein activating the file as a running online application at a second instance of time subsequent to the first instance of time and subsequent to navigating away from the website continues running of the previously running online application from the prior first instance of time.

19. The method of claim 18, further comprising:
receiving a second application via the network;
removing the online application from the first memory;
storing the second application in the first memory;
activating the second application as a running second application;
in response to a second request to store a status of the second application, storing in the second memory a second file comprising the second application and second data corresponding to content of the random-access memory associated with the second application at a third instance of time.

* * * * *